(12) United States Patent
Bakken et al.

(10) Patent No.: US 10,145,487 B2
(45) Date of Patent: Dec. 4, 2018

(54) HVAC DEVICE WITH MULTI-DIRECTIONAL CONDUIT FITTING

(71) Applicant: Honeywell International Inc., Morris Plains, NJ (US)

(72) Inventors: Tom Bakken, Apple Valley, MN (US); Matthew Decker, Minneapolis, MN (US); Nathan Carlson, Maple Grove, MN (US); Brad Terlson, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 125 days.

(21) Appl. No.: 15/147,721

(22) Filed: May 5, 2016

(65) Prior Publication Data

US 2017/0321818 A1 Nov. 9, 2017

(51) Int. Cl.
*F16K 27/02* (2006.01)
*F16K 31/04* (2006.01)
*F16K 27/04* (2006.01)

(52) U.S. Cl.
CPC ........... *F16K 31/041* (2013.01); *F16K 27/02* (2013.01); *F16K 27/04* (2013.01); *F16K 31/047* (2013.01)

(58) Field of Classification Search
CPC .................................................. F16K 27/0281

USPC .................................. 251/291, 292; 439/446
See application file for complete search history.

(56) References Cited

U.S. PATENT DOCUMENTS

| | | | |
|---|---|---|---|
| 2,503,563 A * | 4/1950 | Ray | F16K 41/16 251/291 |
| 4,810,213 A | 3/1989 | Chabot | |
| 5,499,932 A * | 3/1996 | Tanaka | G01P 1/02 439/446 |
| 5,911,595 A | 6/1999 | Orr, Jr. et al. | |
| 6,644,999 B1 | 11/2003 | Tan et al. | |
| 6,662,821 B2 * | 12/2003 | Jacobsen | F16K 31/05 251/292 |
| 7,074,087 B2 | 7/2006 | Szczesny et al. | |
| 7,186,133 B1 | 3/2007 | Szczesny | |
| 7,234,963 B1 | 6/2007 | Huang | |
| 7,494,376 B1 | 2/2009 | Foltz | |
| 7,507,108 B2 | 3/2009 | Tsuji | |
| 7,871,288 B1 | 1/2011 | Lee | |
| 8,935,849 B2 | 1/2015 | Gross et al. | |
| 8,968,023 B1 | 3/2015 | Walters et al. | |
| 2004/0216912 A1 | 11/2004 | Osborn, Jr. | |

* cited by examiner

*Primary Examiner* — Eric Keasel
(74) *Attorney, Agent, or Firm* — Seager Tufte & Wickhem LLP

(57) ABSTRACT

An HVAC device includes a housing and a conduit tube that defines a lumen into the housing. The conduit tube and/or housing are configured such that rotating the conduit tube relative to the housing changes the direction that an outlet of the conduit tube faces. This may promote easier installation and/or maintenance of the HVAC device in the field, especially in cramped and/or poorly illuminated areas.

19 Claims, 19 Drawing Sheets

HVAC DEVICE WITH MULTI-DIRECTIONAL CONDUIT FITTING

TECHNICAL FIELD

The present disclosure generally relates to HVAC devices, and more particularly to conduit fittings for HVAC devices.

BACKGROUND

Heating, Ventilation and/or Air Conditioning (HVAC) systems are commonly used to condition air within buildings and other structures. Such HVAC systems also often include a heat source such as a furnace or a boilers, a cooler such as an air conditioner, a ventilator, one or more controllers and/or other devices. In some cases, HVAC systems can include actuatable valves such as air dampers, water valves, gas valves, ventilation flaps, louvers, and/or other actuatable devices that help regulate or control the flow of fluid in the HVAC system.

Many HVAC systems include devices that are located in tight spaces, such as behind industrial process equipment, within walls, crawl spaces, or attic spaces of a building or other structure. These areas are often poorly illuminated and/or cramped, leaving little room for installation and/or maintenance. Access for tools or even a second hand can often be difficult and problematic. A similar problem often exists for actuatable valves and/or other equipment used in industrial processes.

Control and/or power cables are often fed through a conduit to connect to such devices. In many cases, the conduit must be connect to the device at fixed location on the device and from a fixed direction. Because of this, and in some installations, the control and/or power cables must make an immediate bend just outside of the device, which can be difficult to manage in cramp and/or poorly illuminated spaces. In some cases, the space itself may prevent sufficient access to connect a conduit to the fixed location on the device from the fixed direction.

What would be desirable is a device that facilitates connecting a conduit and/or threading wires to the device from different directions, which may promote easier installation and/or maintenance in the field, especially in cramped and/or poorly illuminated areas.

SUMMARY

The present disclosure generally relates to HVAC devices, and more particularly to conduit fittings for such HVAC devices. An illustrative valve actuator assembly may include a housing and an electric motor situated in the housing. A drive train may be operatively coupled to the electric motor for rotating the actuator output. A first conduit tube defining a lumen having an inlet facing inside of the housing and an outlet facing outside of the housing may be rotatably coupled to the housing. The first conduit tube may be configured to change the direction that the outlet of the first conduit tube faces when the first conduit tube is rotated relative to the housing.

An illustrative Heating, Ventilation, and Air Conditioning (HVAC) device for controlling one or more HVAC components of an HVAC system of a building may comprise a housing and one or more electrical components situated in the housing. A first conduit tube defining a lumen having an inlet facing inside of the housing and an outlet facing outside of the housing may be rotatably coupled to the housing. The first conduit tube may be configured to change the direction that the outlet of the first conduit tube faces when the first conduit tube is rotated relative to the housing.

An illustrative valve actuator for actuating a valve may comprise a housing, an actuator output, an electric motor situated in the housing, a drive train operatively coupled to the electric motor for rotating the actuator output, a first conduit tube, and a second conduit tube. The housing may comprise a first side and an opposing second side. The second side of the housing may comprise a first conduit receiving region that is not parallel to the first side and a second conduit receiving region that is not parallel to the first side and not parallel to the first conduit receiving region. The first conduit tube may be rotatably coupled to the first conduit receiving region of the housing and the second conduit tube may be rotatably coupled to the second conduit receiving region of the housing.

The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
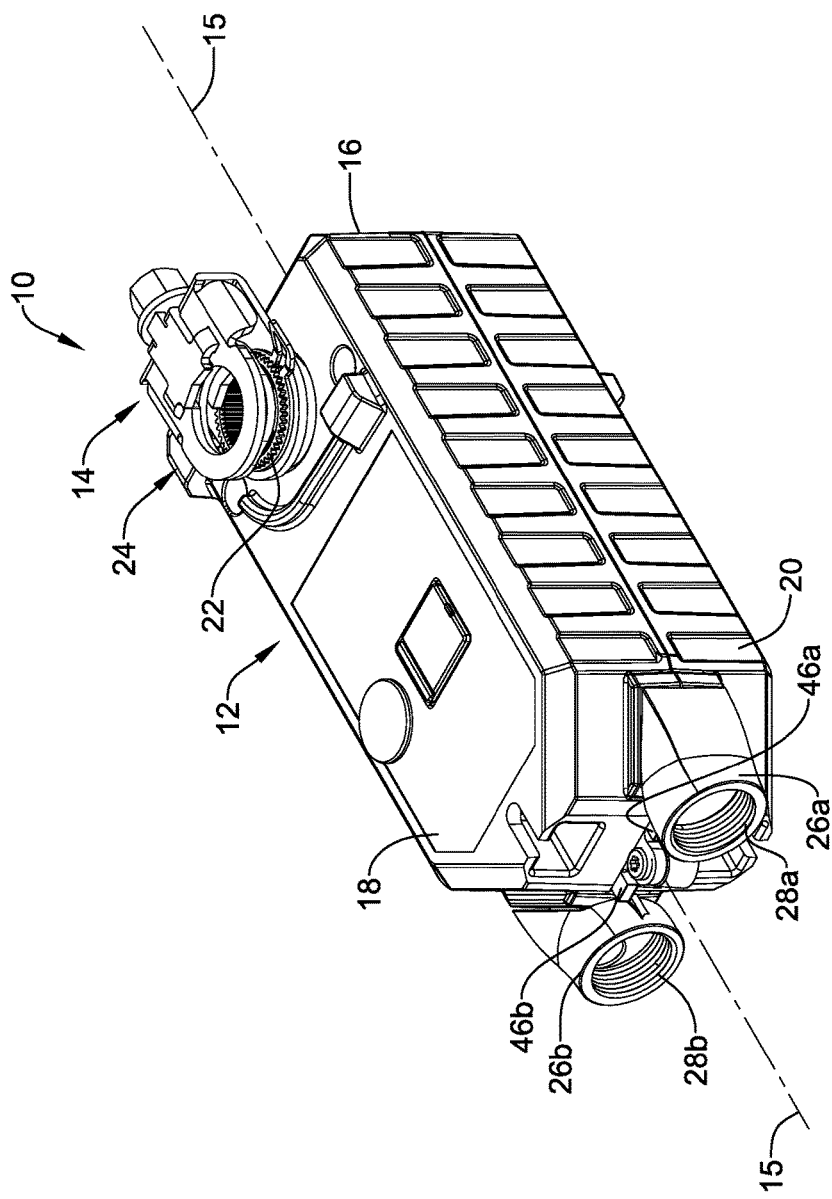
FIG. 1 is a perspective view of an illustrative HVAC valve actuator for driving an air damper of an HVAC system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Figure 1A:
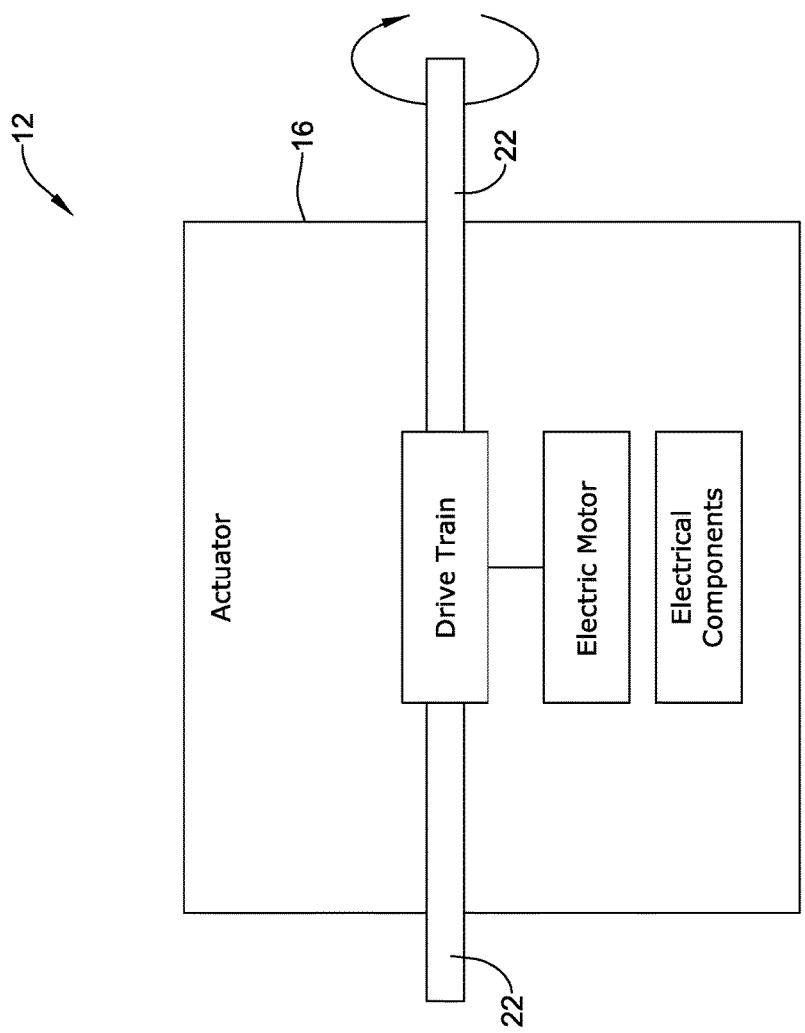
FIG. 1A is a schematic view of the illustrative HVAC valve actuator of FIG. 1.

FIG. 1 is a perspective view of an illustrative but non-limiting valve actuator 10 for driving a valve shaft, such as a shaft of a Heating, Ventilation, and Air Conditioning (HVAC) air damper (not explicitly shown). FIG. 1A is a schematic view of the illustrative HVAC valve actuator of FIG. 1. While the valve actuator 10 is described as driving a shaft of an HVAC air damper, it is contemplated that the valve actuator may be used to drive any suitable valve shaft including but not limited to water valves within hydronic heating and/or cooling systems, other fluid or gas valves, and/or any other actuatable valve as desired. The illustrative valve actuator 10 includes an actuator 12 and an actuator mounting assembly 14. The actuator 12 includes a housing 16 having a top housing portion 18 and a bottom housing portion 20 that houses an electric motor and a drive train (see FIG. 1A) for rotating a drive member 22. In the example shown, the drive member 22 is a tubular structure that extends through the housing 16 out both the top and bottom sides of the housing 16 as shown. The drive member 22 may have splines, grooves, teeth or other features that allow a shaft adapter 24 of the actuator mounting assembly 14 to engage the drive member. The shaft adapter 24 may also be configured to engage a valve shaft (not shown), and may transfer rotational movement from the drive member 22 to a valve shaft (not shown).

In the example shown, the actuator 12 may include conduit tubes or fittings 26a, 26b (collectively 26) extending from an end thereof. While the actuator 12 is shown and described as including two conduit tubes 26, it is contemplated that the actuator 12 may include fewer than two conduit tubes 26 or more than two conduit tubes 26, as desired. For example, the actuator 12 may be structured to accommodate more than one conduit tube 26, however, only a single conduit tube 26 may be necessarily. This may allow for a variety of possible configurations. Each conduit tube 26a, 26b may be the same size and shape as the other(s) but have a different spatial arrangement. As used herein, reference to a generic conduit or conduit structure may lack the "a" or "b" denotation while the "a" and "b" denotation may be used to differentiate between two conduits on the same actuator. Cables (for example, for providing power and/or control signals to the actuator) may exit the actuator 12 through an outlet opening 28a, 28b defined in an end of the conduit tube 26a, 26b. In some instances, the conduit tubes 26 may be positioned such that the cables exit the actuator 12 in line with a longitudinal axis 15 of the actuator 12. For example, the plane of the outlet opening 28 may be generally orthogonal to the longitudinal axis 15 of the actuator 12. In some applications, it may be desirable for the cable and/or conduit to make an immediate bend after exiting the actuator 12 due to wiring and/or space constraints. In the example shown, the conduit tubes 26 may be rotatable or otherwise positionable to allow the user to select the direction that the cable and/or conduit exits the actuator 12. This may allow the user to adjust the direction of the cable and/or conduit without requiring additional fittings, tools and/or adding length to the actuator 12. The conduit tubes 26 may be individually movable such that each tube 26a, 26b may be adjusted independently of the other. For example, as will be described in more detail below with respect to FIGS. 11A-11F, the openings 28a, 28b of the conduit tubes 26a, 26b may not necessarily be positioned in the same orientation.

Figure 2:
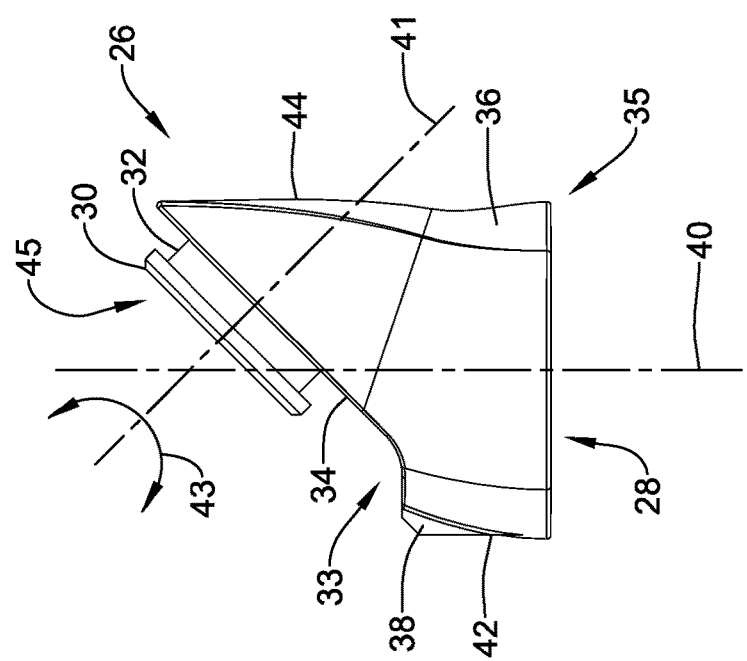
FIG. 2 is a side view of an illustrative conduit fitting of FIG. 1.

FIG. 2 shows a side view of an example conduit tube 26. The conduit tube 26 may be formed from a single unitary structure or may be multiple components coupled together, as desired. The conduit tube 26 may include a flange 30 and a neck region 32 extending from a body portion 36. The neck region 32 may extend from an angled surface 34 at the first end 33 of the body portion 36. The flange 30 may be positioned at an end of the neck region 32. The flange 30 and neck region 32 may extend along an axis 41 that is at a non-orthogonal angle to a longitudinal axis 40 extending out of the outlet opening 28 of the conduit tube 26. When the conduit tube 26 is coupled with the actuator 12, the conduit tube 26 may be rotated about axis 41, as shown at 43, to change the orientation or direction that the outlet opening 28 faces. The edge of the conduit tube 26 between the neck region 32 and the body portion 36 may define a mating surface 34 configured to engage or generally align with a mating angled face of the actuator 12. The mating surface 34 of the conduit tube 26 may have an angled surface that is at a generally non-orthogonal angle to the longitudinal axis 40 extending out of the outlet opening 28 of the conduit tube 26. The angled surface 34 may allow the direction of the outlet opening 28 to be positioned in different planes as the conduit tube 26 is rotated 43 about axis 41. It is contemplated that the mating surface 34 may be sized and shaped such that rotation of the conduit tube 26 results in a conical translation of the outlet opening 28 of the conduit tube 26. In other words, during rotation of the conduit tube 26, the flange 30 may remain at a generally fixed location relative to the actuator 12 while the opening 28 moves along a generally arced or circular path. A lumen 45 may extend through the conduit tube 26 from an inlet at the flange 30 to the outlet opening 28 to allow one or more cable and/wires to pass through the conduit tube 26 and into the inside of the housing 20 (e.g. to connect to an electric motor, relay, control circuit and/or the like).

In some instances, a stop mechanism 38, or protrusion may extend laterally from a first side 42 of the conduit tube. The stop mechanism 38 may be configured to engage a stop mechanism 46a, 46b (e.g. at least one stop mechanism for each conduit tube 26) on the actuator 12 to limit a range of rotational movement of the conduit tube 26. For example, as the conduit tube 26 is rotated, the stop mechanism 38 may come into contact with a top portion or a bottom portion (depending on the direction of rotation) of the stop mechanism 46a, 46b on the actuator 12. This may prevent the conduit tube 26 from being rotated beyond 360° about axis 41. It is contemplated that rotation greater than 360° may twist or kink a cables within the conduit, which is undesirable.

The stop mechanism 46a, 46b may be a protruding portion extending from an end surface 61 (see for example, FIG. 3) of the actuator 12. The end surface 61 may be positioned between a first region 51a, or angled face, and a second region 51b, or angled face, and may extend generally perpendicular to the longitudinal axis 15 of the actuator 12 and generally parallel to the opposing side 63. In some cases, the angled surfaces 51a and 51b may each extend along a plane that intersects the longitudinal axis 40 at an angle between about 20 and 80 degrees, between 30 and 60 degrees, about 45 degrees or any other suitable angle, as desired. In some cases, the angled surfaces 51a and 51b may each extend along a plane that intersects the end surface 61 at an angle between about 20 and 80 degrees, between 30 and 60 degrees, about 45 degrees or any other suitable angle, as desired While the stop mechanisms 46a, 46b are illustrated on the top housing portion 18, it is contemplated that the stop mechanisms 46a, 46b may be on either or both the top housing portion 18 and/or the bottom housing portion 20, as desired. The degree of rotation of the conduit tube 26 may be determined by the size, position and/or quantity of stop mechanisms 46a, 46b on the actuator 12 and/or the size, position and/or quantity of stop mechanisms 38 on the conduit tube 26. For example, a second stop mechanism may be provided on the conduit tube 26 and spaced a distance from the first stop mechanism 38. This is just an example. It is contemplated that any combination of shapes, sizes, and/or quantities of stop mechanisms 38, 46a, 46b may be used to limit rotation of the conduit tube 26 to a desired range of rotation. For example, the rotation of the conduit tube 26 may be limited to 360° or less, 345° or less, 300° or less, 270° or less, etc. In some cases, stop mechanisms may not be provided at all, and the conduit tube 26 may rotate endlessly.

Figure 3:
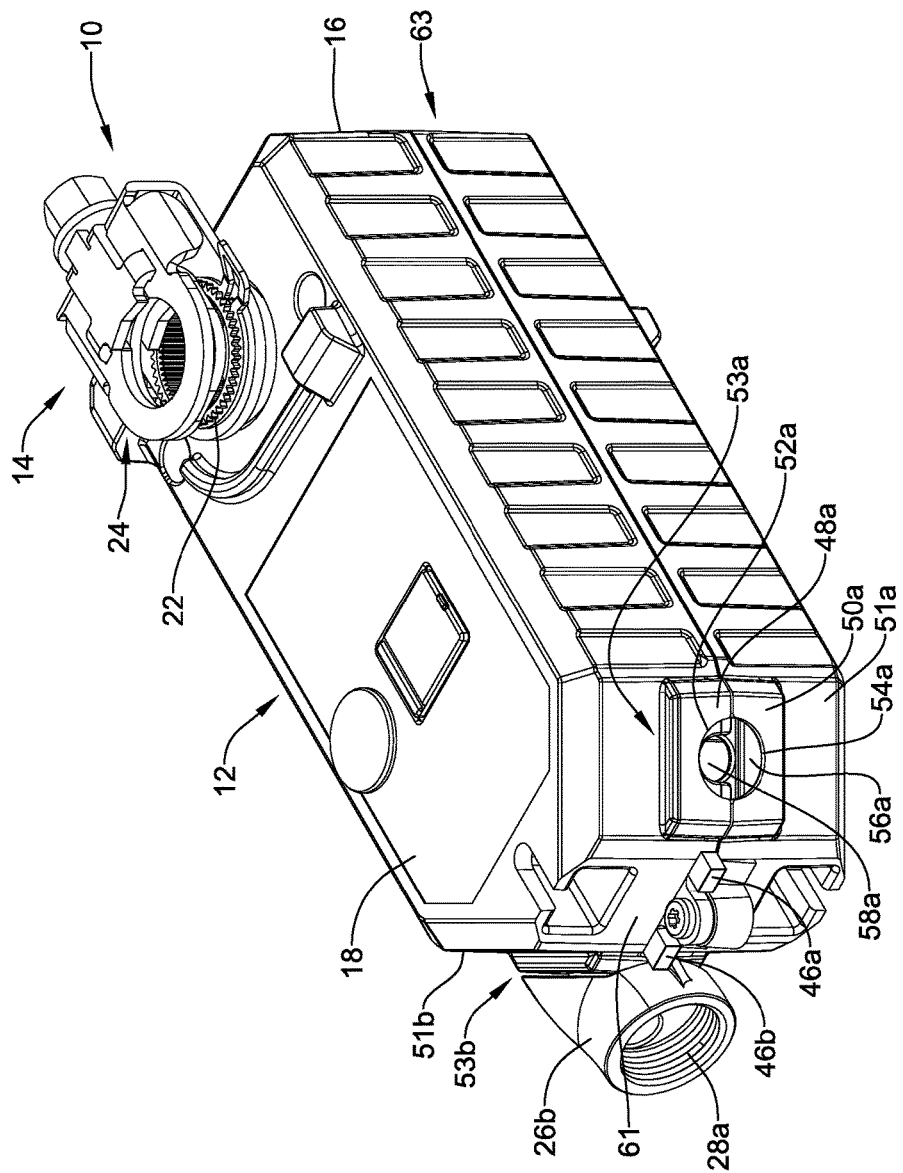
FIG. 3 is a perspective view of the illustrative valve actuator of FIG. 1 with a conduit fitting removed.

FIG. 3 is a perspective view of the illustrative but non-limiting valve actuator 10 of FIG. 1 with one of the conduit tubes 26a removed. In the example shown, the actuator 12 may have a generally rectangular prism shape, although this is not required and it is contemplated that the actuator 12 may take any shape desired. In the example shown, the actuator housing 16 includes a pair of angled faces 51a, 51b on an end thereof. The angled faces 51a, 51b may generally define first and second conduit receiving regions. The angled faces 51a, 51b may be formed on an end surface of the housing 16 such that each angled face 51a, 51b extends in plane that is non-orthogonal to the longitudinal axis 15 of the actuator 12 and thus non-parallel with the opposing side 63 of the actuator housing. The angled faces 51a, 51b may generally align with or mate with the mating surface 34 of the conduit tube 26. It is further contemplated that the angled faces 51a, 51b may not extend in the same plane. For example, the first angled face 51a and the second angled face 51b may be mirror images of one another. As described above, the angled faces 51a, 51b may be spaced a distance from one another via an intermediate end wall 61, as shown in FIG. 3, although this is not required.

In some embodiments, the actuator housing 16 may include a wall or protruding portion 53a, 53b extending from the angled faces 51a, 51b and defining a cavity between the wall 53a, 53b and the angled faces 51a, 51b, as will be described in more detail below. The protruding portions 53a, 53b may be configured to removably couple the conduits 26a, 26b to the actuator 12. The details of protruding portions 53a, 53b will be described with respect to protruding portion 53a. However, as can be seen in subsequent figures, protruding portion 53b may be a mirror image of protruding portion 53a.

A first portion 48a of the protruding portion 53a may extend from the top housing portion 18. A semi-circular recess 52a may be formed in a lower region of the first portion 48a. The recess 52a may be configured to generally align with a corresponding semi-circular recess 54a formed in an upper region of a second portion 50a of the protruding portion 53a. The second portion 50a of the protruding portion 53a may extend from the bottom housing portion 20. Together, the recesses 52a, 54a may form a first generally circular through-hole or aperture configured to receive the neck 32 of the conduit tube 26. A second generally circular aperture 58a may be formed at a location interior to the protruding portion 53a to allow a cable to pass from an inside cavity within the housing 16 and through the lumen 45 of the conduit tube 26. While the recesses 52a, 54a are described as having a semi-circular shape, the recesses 52a, 54a may take any suitable shape as desired. The aperture 58a may also take any shape desired.

Figure 4:
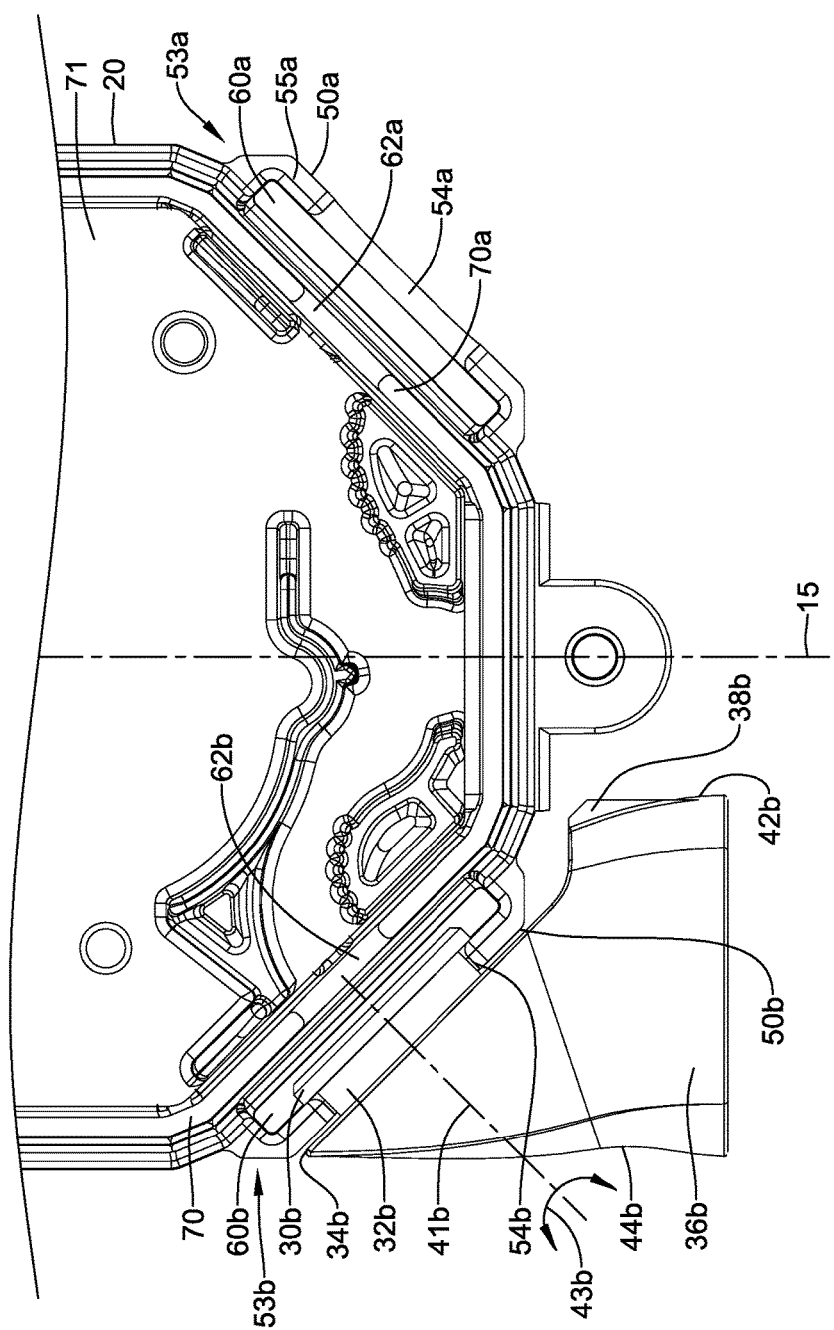
FIG. 4 is a top view of the illustrative valve actuator of FIG. 1 with a top part of the housing removed.
Figure 5A:
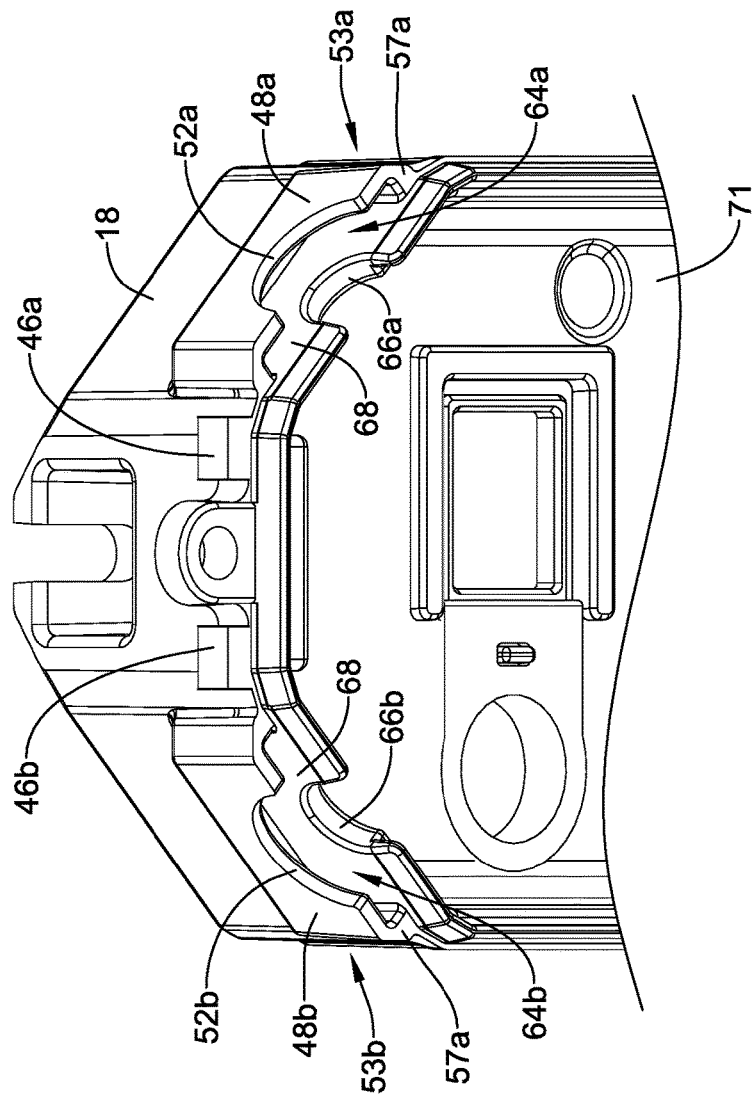
FIG. 5A is a partial perspective view of a top housing of the illustrative valve actuator of FIG. 1.
Figure 5B:
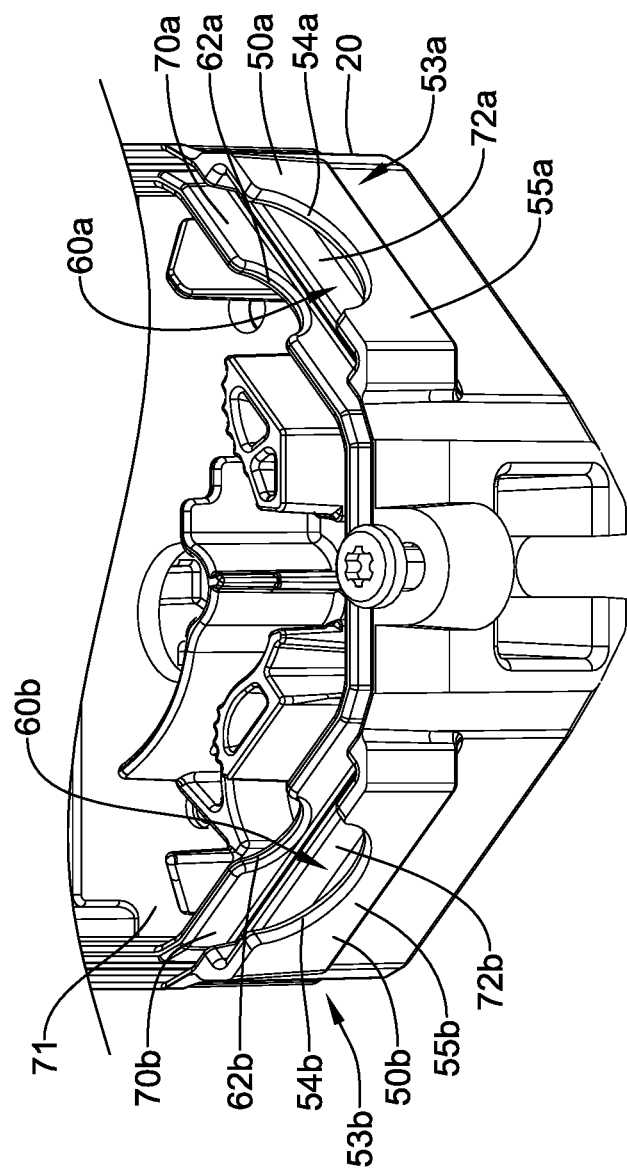
FIG. 5B is a partial perspective view of the bottom housing of the illustrative valve actuator of FIG. 1.

The mating features of the conduit tubes 26 and the housing 16 will be now be described with respect to FIG. 4, which illustrates a top view of the illustrative but non-limiting valve actuator 10 of FIG. 1 with the top housing portion 18 and one of the conduit tubes 26a removed. FIGS. 5A and 5B illustrate a perspective views of the top housing portion 18 and the bottom housing portion 20, respectively, with both conduit tubes 26a, 26b removed. As can be seen in FIG. 4, the conduit tube 26b may be releasable coupled with the protruding portion 53b such that the inlet of the conduit tube 26b faces inside of the housing and the outlet 28b faces outside of the housing. While the relationship between the conduit tube 26 and the protruding portion 53 is described with respect to one of the conduit tubes 26b, it should be understood that the other conduit tube 26a engages the protruding portion 53a in a similar manner.

The second portion 50a, 50b of the protruding portion 53a, 53b may have a wall 55a, 55b defining a cavity or recess 60a, 60b therein. The cavity 60b may be sized and shaped to receiving the flange 30b of the conduit tube 26b. As described above, the neck 32b of the conduit tube 26b may rest in the recess 54b formed in the wall 55b of the protruding portion 53b. The recess 54b in combination with recess 52b may be similar in size (e.g. have a diameter) to an outer dimension of the neck 32b or may be slightly larger. It is contemplated that the recess 54b in combination with recess 52b may form an aperture having a diameter that is smaller than a diameter of the flange 30b. This may secure the flange 30b within the recess 60b when the top housing portion 18 is secured or coupled to the bottom housing portion 20. For example, the flange 30b may be sized to prevent the conduit tube 26b from being removed from the recess 60b when the housing 16 is assembled while still allowing for rotational movement 43b of the conduit tube 26b about axis 41b.

The bottom housing portion 20 may further include an interior wall 70. The interior wall 70 may extend around an entire interior inner perimeter of the bottom housing portion 20 or only a portion of the inner perimeter, as desired. The interior wall 70 may include a pair of semi-circular recesses 62a, 62b formed therein. The recesses 62a, 62b may be configured to mate with corresponding recesses 66a, 66b (see, for example, FIG. 5A) formed in top housing portion 18. When the top housing portion 18 and the bottom housing portion 20 are assembled, recess 62a may generally align with recess 66a to form aperture 58a, as shown in FIG. 3. While not explicitly shown, recess 62b and recess 66b may generally align to form a similar aperture for allowing a cable to pass from an interior cavity 71 of the housing 16 to a location external to the housing 16 through the lumen 45 of the conduit tube 26. In some embodiments, an intermediate wall 72a, 72b (see, for example, FIG. 5B) may be provided between the exterior wall 55, 55b and the interior wall 70. The intermediate wall 72a, 72b may limit longitudinal movement of the conduit tube 26 along the axis of rotation 41.

FIG. 5A is a perspective bottom view of the top housing portion 18 with both conduit tubes 26a, 26b removed. The first portion 48a, 48b of the protruding portion 53a, 53b may have a wall 57a, 57b defining a cavity or recess 64a, 64b therein. The cavities 64a, 64b may be sized and shaped to receiving the flanges 30a, 30b of the conduit tubes 26a, 26b. As described above, the neck 32a, 32b of the conduit tube 26a, 26b may rest or be disposed within the recess 52a, 52b formed in the wall 57a, 57b of the protruding portion 53a, 53b. The recess 52a, 52b in combination with recess 54a, 54b may be similar in size (e.g. have a diameter) to an outer dimension of the neck 32a, 32b or may be slightly larger. It is contemplated that the recess 52a, 52b in combination with recess 54a, 54b may form an aperture having a diameter that is smaller than a diameter of the flange 30a, 30b. This may secure the flange 30a, 30b within the recess 64a, 64b when the top housing portion 18 is secured or coupled to the bottom housing portion 20. The recesses 60a, 60b in the bottom housing portion 20 and the recesses 64a, 64b in the top housing portion 18 may generally align to form two larger recesses (e.g. one for each conduit tube 26a, 26b) sized and shaped to receive the flange 30a, 30b. For example, the flange 30a, 30b may be sized to prevent the conduit tube 26a, 26b from being removed from the recess 64a, 64b when the housing 16 is assembled while still allowing for rotational movement of the conduit tube 26a, 26b about an axis thereof.

The top housing portion 18 may further include an interior wall 68. The interior wall 68 may extend around an entire interior inner perimeter of the top housing portion 18 or only a portion of the inner perimeter, as desired. The interior wall 68 may include a pair of semi-circular recesses 66a, 66b formed therein. The recesses 66a, 66b may be configured to mate with corresponding recesses 62a, 62b (see, for example, FIG. 5b) formed in bottom housing portion 20. When the top housing portion 18 and the bottom housing portion 20 are assembled, recess 66a may generally align with recess 62a to form aperture 58a, as shown in FIG. 3. While not explicitly shown, recess 62b and recess 66b may generally align to form a similar aperture for allowing a cable to pass from an interior cavity 71 of the housing 16 to a location external to the housing 16 through the lumen 45 of the conduit tube 26.

Figure 6:
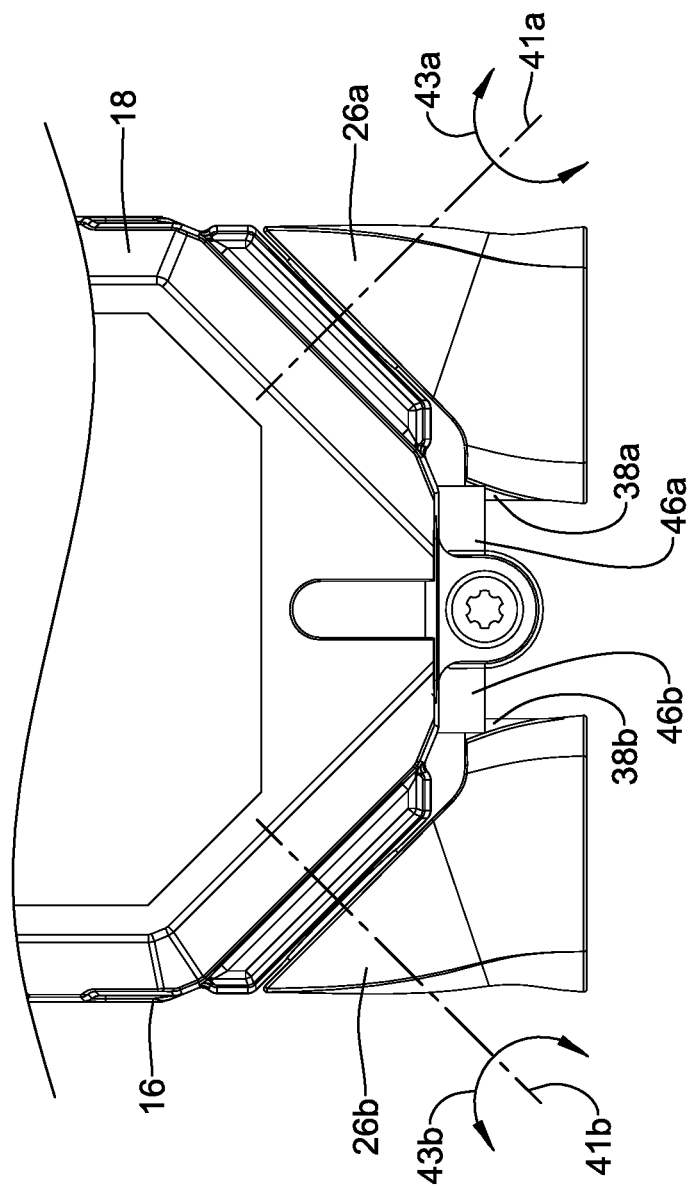
FIG. 6 is a top view of part of the illustrative valve actuator of FIG. 1.

FIG. 6 illustrates a partial top view of the actuator 10. The stop mechanisms 46a, 46b are shown extending from an end of the top housing portion 18. As described above, the stop mechanisms 46a, 46b may alternatively, or additionally, extend from the bottom housing portion 20. As can be seen, the protruding portions 38a, 38b of the conduit tubes 26a, 26b extend laterally beyond the stop mechanisms 46a, 46b. This may prevent continued or continuous rotation of the conduit tubes 26a, 26b. Conduit tube 26a may be rotated as shown at 43a in a clockwise direction about axis 41a until the protruding portion 38a abuts or contacts a lower edge or surface of the stop mechanism 46a on the housing 16. At the point of contact between the lower edge of the stop mechanism 46a and the protruding portion 38a of the conduit tube 26a, the conduit tube 26a resists further rotation in the clockwise direction. The direction of rotation 43a of the conduit tube 26a may be reversed (e.g. the conduit tube 26a may be rotated in the counter-clockwise direction) to position the opening 28a in the desired orientation. It is contemplated that the conduit tube 26a may be rotated 43a in a counter-clockwise direction about axis 41a until the protruding portion 38a abuts or contacts an upper edge or surface of the stop mechanism 46a on the housing 16. Conduit tube 26b may have a reverse configuration. For example, clockwise rotation of conduit tube 26b about axis 41b may bring the protruding portion 38b into contact with the upper edge or surface of the stop mechanism 46b while counter-clockwise rotation of conduit tube 26b about axis 41b may bring the protruding portion 38b into contact with the lower edge or surface of the stop mechanism 46b. These are just examples of some illustrative configurations that may be used to prevent or reduce continuous rotation. It is contemplated that the stop mechanisms 46a, 46b and/or protruding portions 38a, 38b may be arranged in any configuration desired. For example, it is contemplated that the stop features may be provided on the neck 32 and/or flange 30 of the conduit tube 26 and/or at a point internal to the housing 16 (for example, at any point on or along recesses 52a, 52b, 54a, 54b, 60a, 60b, 62a, 62b).

Figure 7:
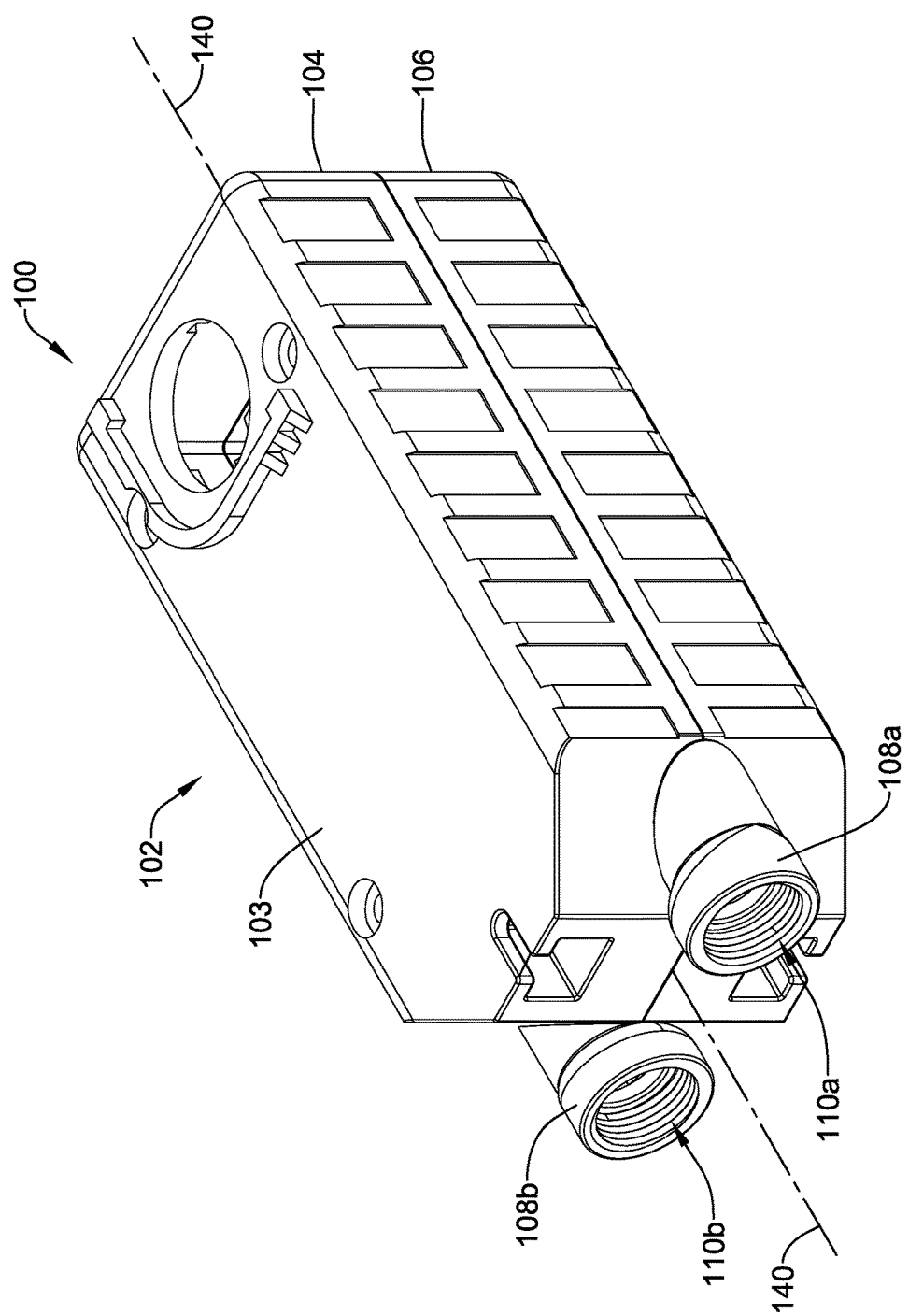
FIG. 7 is a perspective view of another illustrative but non-limiting valve actuator for driving an air damper of an HVAC system.

FIG. 7 is a perspective view of another illustrative but non-limiting valve actuator 100 for driving a valve shaft, such as a shaft of an HVAC air damper (not explicitly shown). While the valve actuator 100 is described as driving a shaft of an HVAC air damper, it is contemplated that the valve actuator may be used to drive any suitable valve shaft including but not limited to water valves within hydronic heating and/or cooling systems, other fluid or gas valves, and/or any other actuatable valve as desired. The illustrative valve actuator 100 includes an actuator 102. While not explicitly shown, the actuator 102 may include an actuator mounting assembly, a drive member and/or a shaft adaptor similar in form and function to those described above with respect to FIG. 1. In the example shown, the actuator 102 includes a housing 103 having a top housing portion 104 and a bottom housing portion 106 that contains an electric motor (not shown) and in some cases as drive train (not shown) for rotating a drive member (also not shown in FIG. 7).

The actuator 102 may include conduit tubes or fittings 108a, 108b (collectively 108) extending from an end thereof. While the actuator 102 is shown and described as including two conduit tubes 108, it is contemplated that the actuator 102 may include fewer than two conduit tubes 108 or more than two conduit tubes 108, as desired. Each conduit tube 108a, 108b may be the same size and shape as the other but have a different spatial arrangement. For example, conduit 108a is positioned in an arrangement that is approximately 180° opposite that of conduit 108b (or in mirror image). As used herein, reference to a generic conduit or conduit structure may lack the "a" or "b" denotation while the "a" and "b" denotation may be used to differentiate between two conduits on the same actuator. Cables (for example, for providing power and/or control commands to the actuator) may exit the actuator 102 through an opening 110a, 110b defined in an end of the conduit tube 108a, 108b. In some instances, the conduit tubes 108 may be positioned such that the cables exit the actuator 102 in line with (i.e. parallel with) a longitudinal axis 1126 of the actuator 102. For example, the plane of the outlet opening 110 may be generally orthogonal to the longitudinal axis 1126 of the actuator 102. In some applications, it may be desirable for the cable and/or conduit to make an immediate bend after exiting the actuator 102 due to wiring and/or space constraints. The conduit tubes 108 may be rotatable or otherwise positionable to allow the user to select the direction that the cable and/or conduit exits the actuator 102. This may allow the user to adjust the direction of the cable and/or conduit without requiring additional fittings, tools and/or adding length to the actuator 102. The conduit tubes 108 may be individually movable such that each tube 108a, 108b may be adjusted independently of the other. For example, as will be described in more detail below with respect to FIGS. 11A-

11F, the outlet openings 110a, 110b of the conduit tubes 108a, 108b may not necessarily be positioned in the same orientation.

Figure 8:
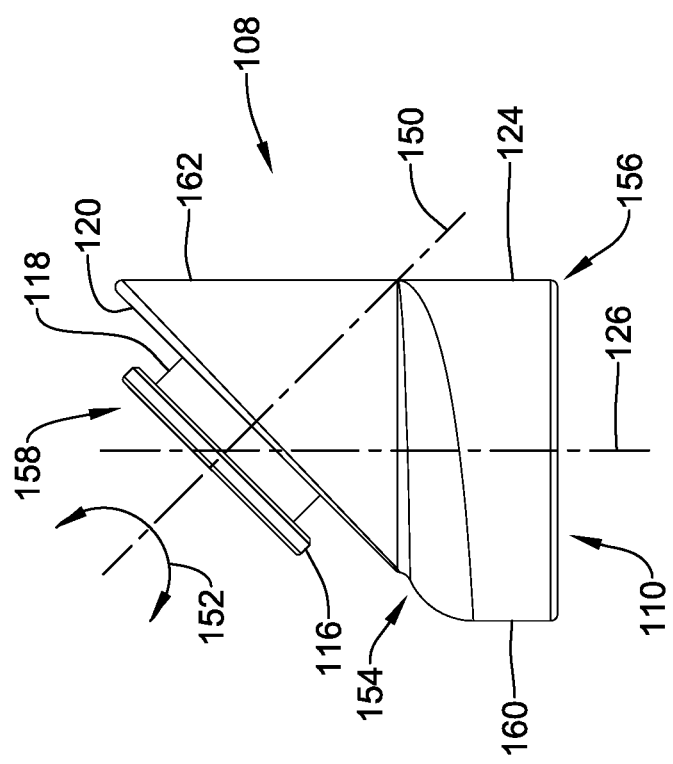
FIG. 8 is a side view of an illustrative conduit fitting of FIG. 7.

FIG. 8 is a side view of an example conduit tube 108. The conduit tube 108 may include a flange 116 and a neck region 118 extending form a body portion 124. The flange 116 and neck region 118 may extend along an axis 150 that is at a non-orthogonal angle to a longitudinal axis 126 of the conduit tube 108. When the conduit tube 108 is coupled with the actuator 102, the conduit tube 108 may be rotated about axis 150, as shown at 152, to change the orientation or direction of the opening 110. The edge of the conduit tube 108 between the neck region 118 and the body portion 124 may define a mating surface 120 configured to engage or generally align with a mating angled face of the actuator 102. The mating surface 120 of the conduit tube 108 may have an angled surface that is at a generally non-orthogonal angle to the longitudinal axis 126 of the conduit tube 108. The angled surface 120 may allow the direction of the opening 110 to be positioned in different planes as the conduit tube 108 is rotated about axis 150. It is contemplated that the mating surface 120 may be sized and shaped such that rotation of the conduit tube 108 results in a conical translation of the opening 110 of the conduit tube 108. In other words, during rotation of the conduit tube 108, the flange 116 may remain at a generally fixed location relative to the actuator 102 while the outlet opening 110 moves along a generally arced or circular path. A lumen 158 may extend through the conduit tube 108 from an inlet at the flange 116 to the outlet opening 110 to allow one or more cable and/wires to pass through the conduit tube 108 and into the inside of the housing 103 (e.g. to connect to an electric motor, relay, control circuit and/or the like).

While not explicitly shown, the conduit tube 108 may be provided with a protrusion, or other stop feature, configured to engage a corresponding feature on the housing 103 to limit rotational movement of the conduit tube 108. The stop features may be similar in form and function to the stop mechanisms 38a, 38b, 46a, 46b described above. This may prevent the conduit tube 108 from being rotated beyond 360° about axis 150. It is contemplated that rotation greater than 360° may twist or kink a cables within the conduit, which is undesirable. The range of rotation of the conduit tube 108 may be determined by the size, position and/or quantity of stop mechanisms on the actuator 102 and/or the size, position and/or quantity of stop mechanisms on the conduit tube 108. It is contemplated that any combination of shapes, sizes, and/or quantities of stop mechanisms may be used to limit rotation of the conduit tube 108 to the desired amount. For example, the rotation of the conduit tube 108 may be limited to 360° or less, 345° or less, 300° or less, 270° or less, etc.

Figure 9:
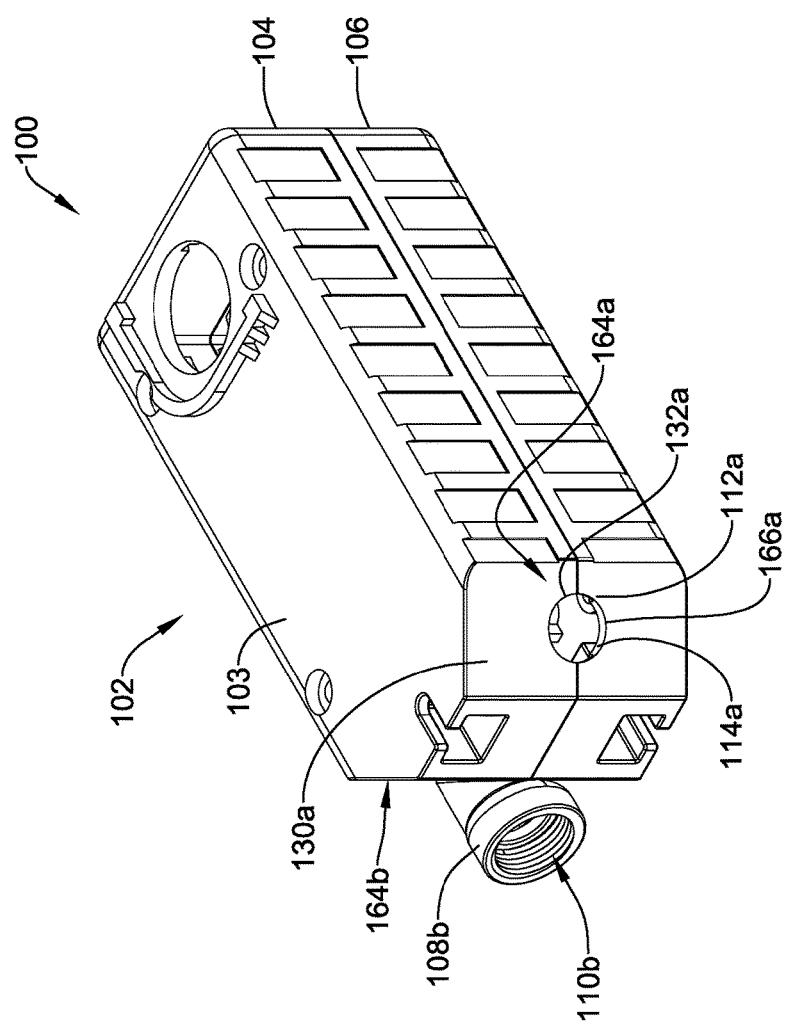
FIG. 9 is a perspective view of the illustrative valve actuator of FIG. 7 with a conduit fitting removed.

FIG. 9 is a perspective view of the illustrative but non-limiting valve actuator 100 of FIG. 7 with one of the conduit tubes 108a removed. The actuator 102 may have a generally rectangular prism shape, although this is not required and it is contemplated that the actuator 100 may take any shape desired. In the example shown, the actuator housing 103 includes a pair of angled faces 164a, 164b on an end thereof. The angled faces 164a, 164b may generally align or mate with the mating surface 120 of the conduit tube 108. The angled faces 164a, 164b will be described with respect to angled face 164a. However, as can be seen in subsequent figures, angled face 164b may be a mirror image of angled face 164a.

A first portion 130a of the angled face 164a may be formed by the top housing portion 104 and a second portion 112a of the angled face 164a may be formed by the bottom housing portion 106. A semi-circular recess 132a may be formed in a lower region of the first portion 130a. The recess 132a may be configured to generally align with a corresponding semi-circular recess 114a formed in an upper region of the second portion 112a of the angled face 164a. Together, the recesses 132a, 114a may form a first generally circular aperture configured to receive the neck 118a of the conduit tube 108a. For example, the neck 118a may rest on surface 166a.

Figure 10A:
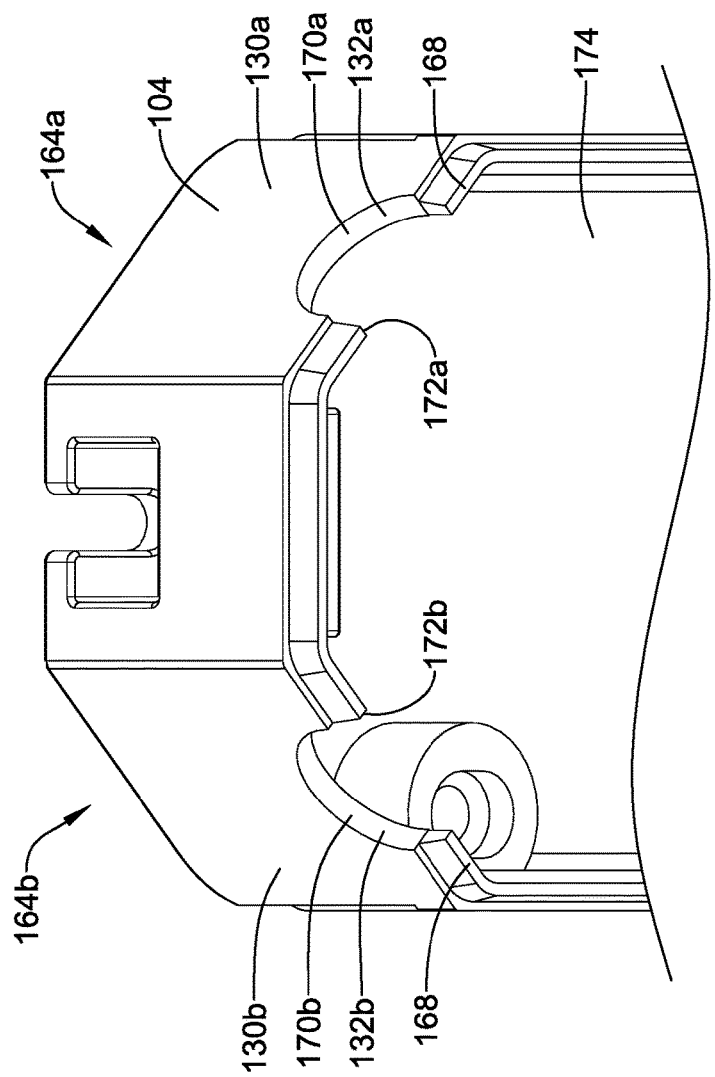
FIG. 10A is a partial perspective view of the top housing of the illustrative valve actuator of FIG. 7.
Figure 10B:
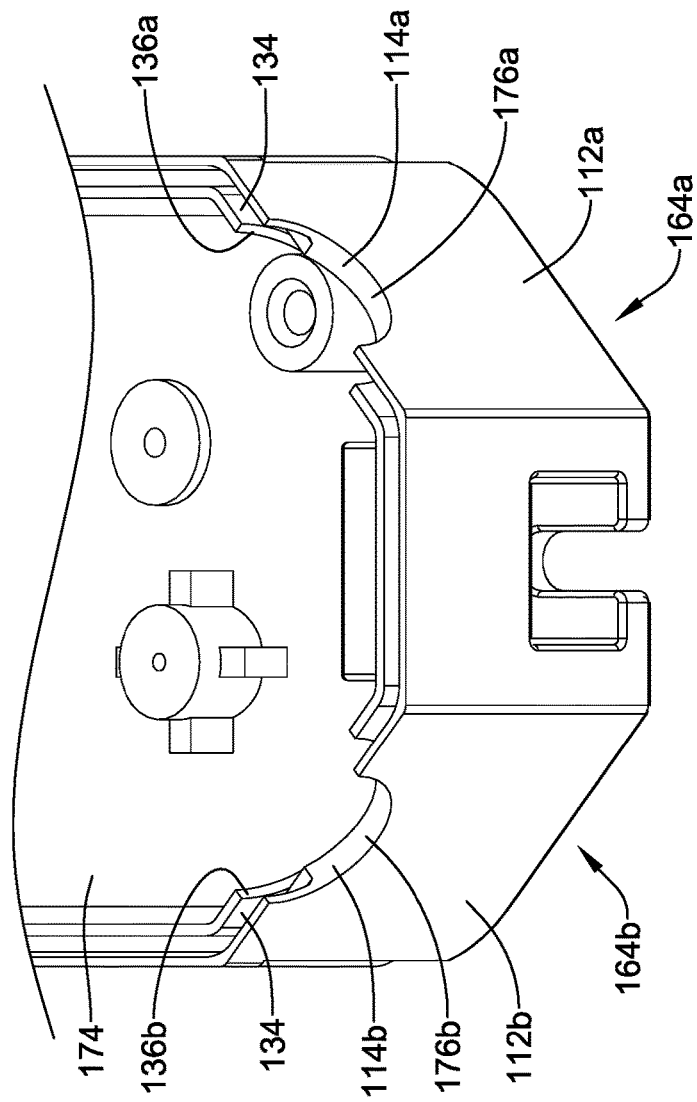
FIG. 10B is a partial perspective view of the bottom housing of the illustrative valve actuator of FIG. 7.

The mating features of the conduit tubes 108 and the housing 103 will be now be described with respect to FIGS. 10A and 10B which illustrate a perspective views of the top housing portion 104 and the bottom housing portion 106, respectively, with both conduit tubes 108a, 108b removed. FIG. 10A illustrates a perspective bottom view of the top housing portion 104 with both conduit tubes 108a, 108b removed. As described above, the angled faces 164a, 164b may include a first portion 130a, 130b formed by the top housing portion 104. A semi-circular recess 132a, 132b may be formed in a lower region of the first portion 130a, 130b. While the recesses 132a, 132b are described as having a semi-circular shape, the recesses 132a, 132b may take any shape desired.

The top housing portion 104 may include an interior wall 168. The interior wall 168 may extend around an entire interior inner perimeter of the top housing portion 104 or only a portion of the inner perimeter, as desired. The interior wall 168 may include a pair of semi-circular recesses 172a, 172b formed therein. In some embodiments, the recesses 172a, 172b may be larger than recesses 132a, 132b. For example, recesses 172a, 172b may be sized and shaped to receive flanges 116a, 116b while recesses 132a, 132b may be sized and shaped to receive the necks 118a, 118b of the conduit fittings 108a, 108b. This is just an example. In other embodiments, the recesses 172a, 172b may be similar in size and shape to recesses.

In some embodiments, the first portion 130a, 130b of the angled faces 164a, 164b may have a region 170a, 170b of increased wall thickness near the recesses 132a, 132b, although this is not required. The outer recesses 132a, 132b of the top housing portion 104 in combination with the outer recesses 114a, 114b of the bottom housing portion 106 may be similar in size (e.g. have a diameter) to an outer dimension of the neck 118a, 118b or may be slightly larger. The inner recesses 172a, 172b of the top housing portion 104 in combination with the inner recesses 136a, 136b of the bottom housing portion 106 may be similar in size (e.g. have a diameter) to an outer dimension of the flange 116a, 116b or may be slightly larger.

The bottom housing portion 106 may include an interior wall 134. The interior wall 134 may extend around an entire interior inner perimeter of the bottom housing portion 106 or only a portion of the inner perimeter, as desired. The interior wall 134 may include a pair of semi-circular recesses 136a, 136b formed therein. In some embodiments, the recesses 136a, 136b may be larger than recesses 114a, 114b. For example, recesses 136a, 136b may be sized and shaped to receive flanges 116a, 116b while recesses 114a, 114b may be sized and shaped to receive the necks 118a, 118b of the conduit fittings 108a, 108b. This is just an example. In other embodiments, the recesses 136a, 136b may be similar in size and shape to recesses 114a, 114b.

In some embodiments, the second portion 112a, 112b of the angled faces 164a, 164b may have a region 176a, 176b of increased wall thickness near the recesses 114a, 114b, although this is not required. The outer recesses 114a, 114b of the bottom housing portion 106 in combination with the outer recesses 132a, 132b of the top housing portion 104 may be similar in size (e.g. have a diameter) to an outer dimension of the neck 118a, 118b or may be slightly larger. The inner recesses the inner recesses 136a, 136b of the bottom housing portion 106 in combination with the inner recesses 172a, 172b of the top housing portion 104 may be similar in size (e.g. have a diameter) to an outer dimension of the flange 116a, 116b or may be slightly larger.

It is contemplated that the aperture formed by the outer recesses 132a, 132b of the top housing portion 104 and the outer recesses 114a, 114b may have a diameter that is smaller than a diameter of the flange 116a, 116b. This may secure the flange 116a, 116b within a cavity 174 of the housing 103. For example, the flange 116a, 116b may be sized to prevent the conduit tube 108a, 108b from being removed the assembled housing 103 while still allowing for rotational movement of the conduit tube 108a, 108b about an axis thereof. In some instances, a side surface of the flange 116a, 116b may rest against an interior surface (e.g. surface facing the cavity 174) of the interior wall 168, although this is not required. In other instances, an outer perimeter edge of the flange 116a, 116b may rest on a surface of the interior walls 168, 134 (e.g. on recesses 172a, 172b, 136a, 136b).

Figure 11A:
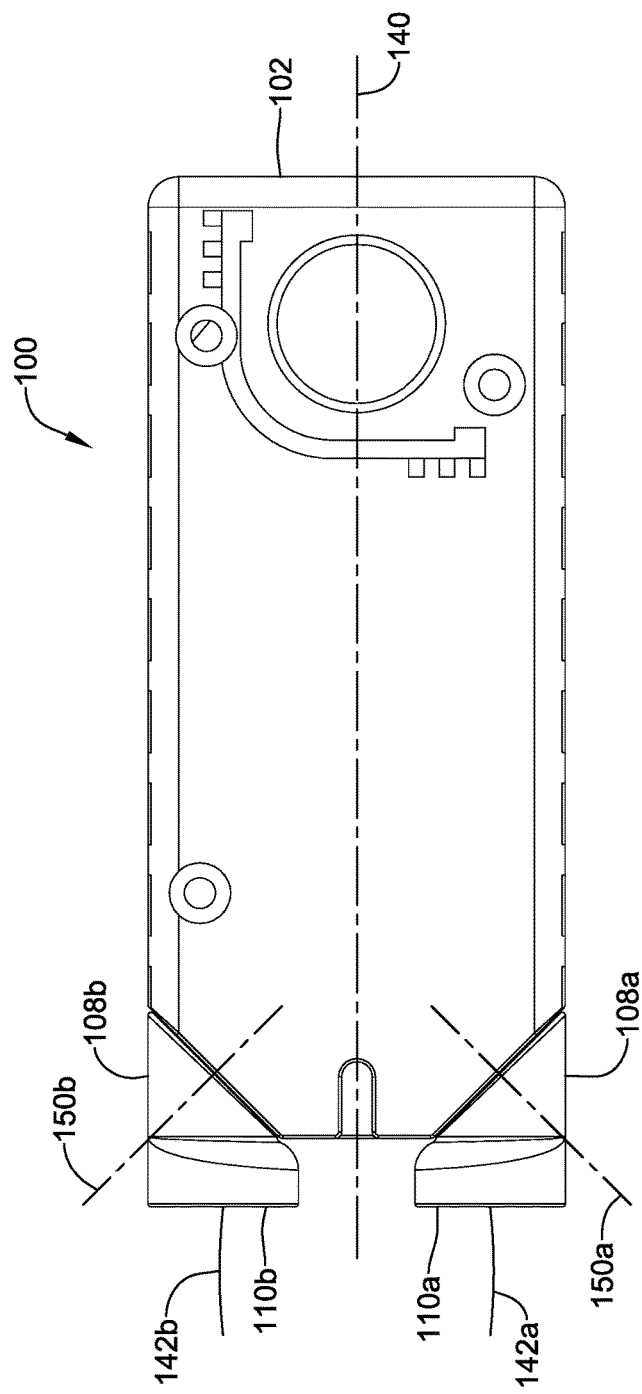
FIGS. 11A-11F are top views of an illustrative valve actuator with the conduit fittings in various configurations.
Figure 11B:
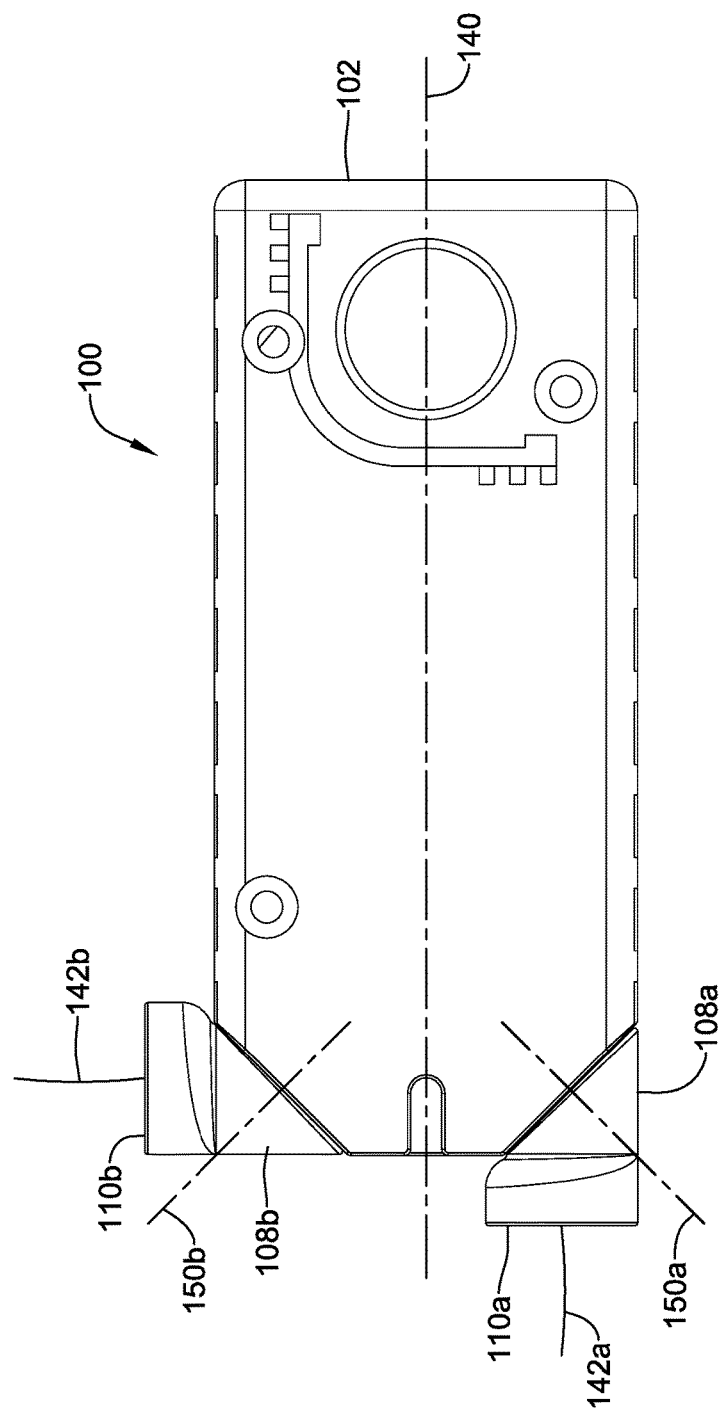

FIGS. 11A-11F show illustrative configurations of the conduit tubes 108a, 108b. These are not intended to be limiting, but rather, illustrate some possible configurations. It should be understood that while the various configurations are illustrated with respect to the actuator 102 of FIG. 7, the actuator 12 of FIG. 1 may be configured in a similar manner. FIG. 11A illustrates a first configuration of the conduit tubes 108a, 108b. As can be seen in FIG. 11A, the conduit tubes 108a, 108b may both be positioned such that the opening 110a, 100b opens in line with (e.g. parallel with) a longitudinal axis 140 of the valve actuator 100. This may allow the cables 142a, 142b to exit the actuator 102 in a direction generally parallel to the longitudinal axis 140. In FIG. 11B, the second conduit tube 108b has been rotated about axis 150b such that the opening 110b opens or faces a direction generally perpendicular to the longitudinal axis 140 of the device 100. This may allow the cable 142b to exit the actuator 102 in a direction generally perpendicular to the longitudinal axis 140, while the first cable 142a exits the actuator 102 in a direction generally parallel to the longitudinal axis 140.

Figure 11C:
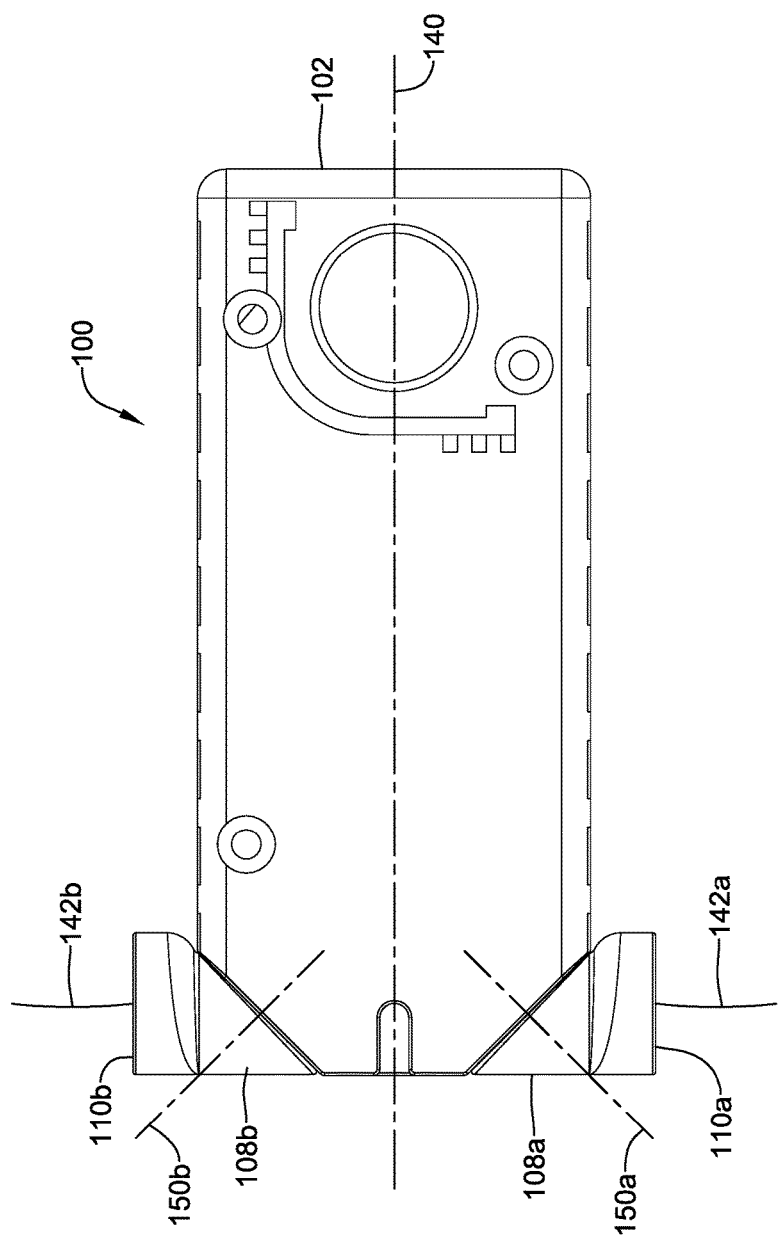
Figure 11D:
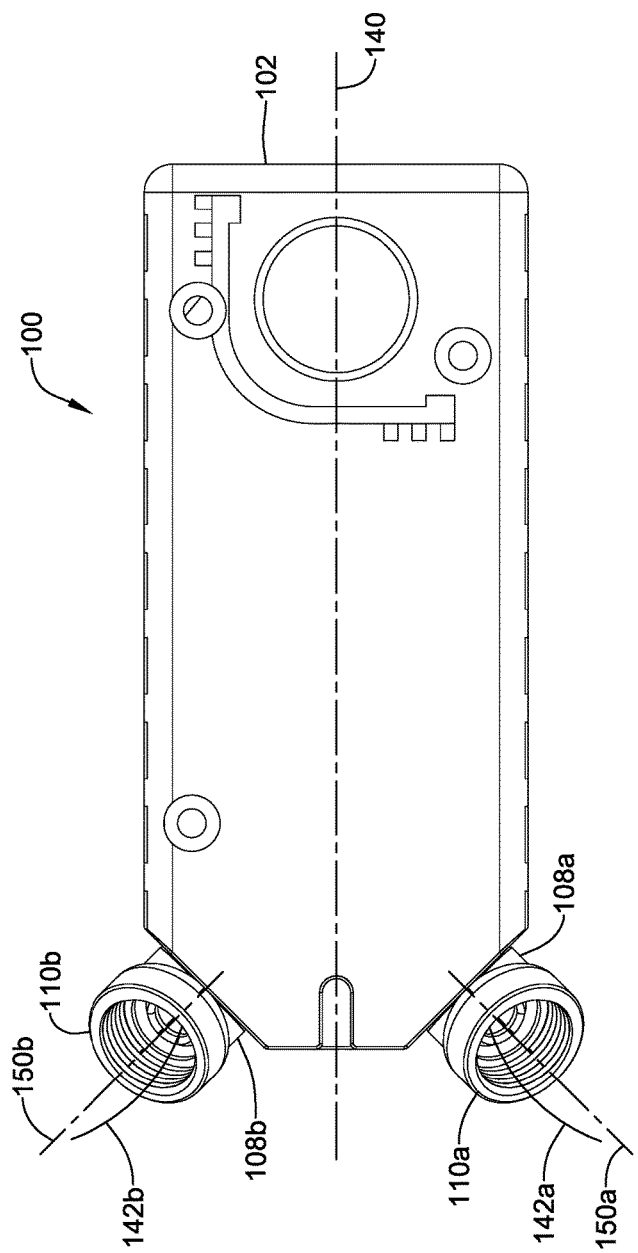
Figure 11E:
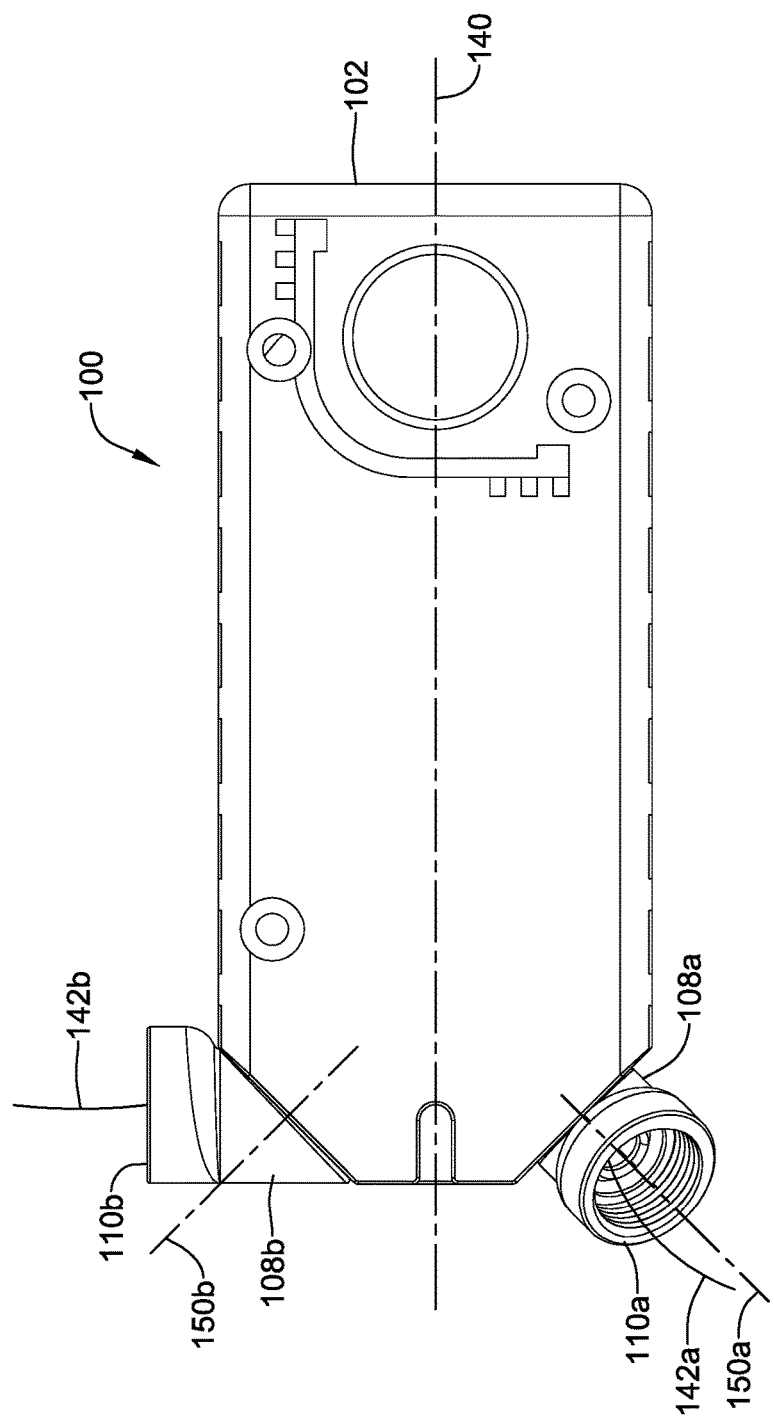
Figure 11F:
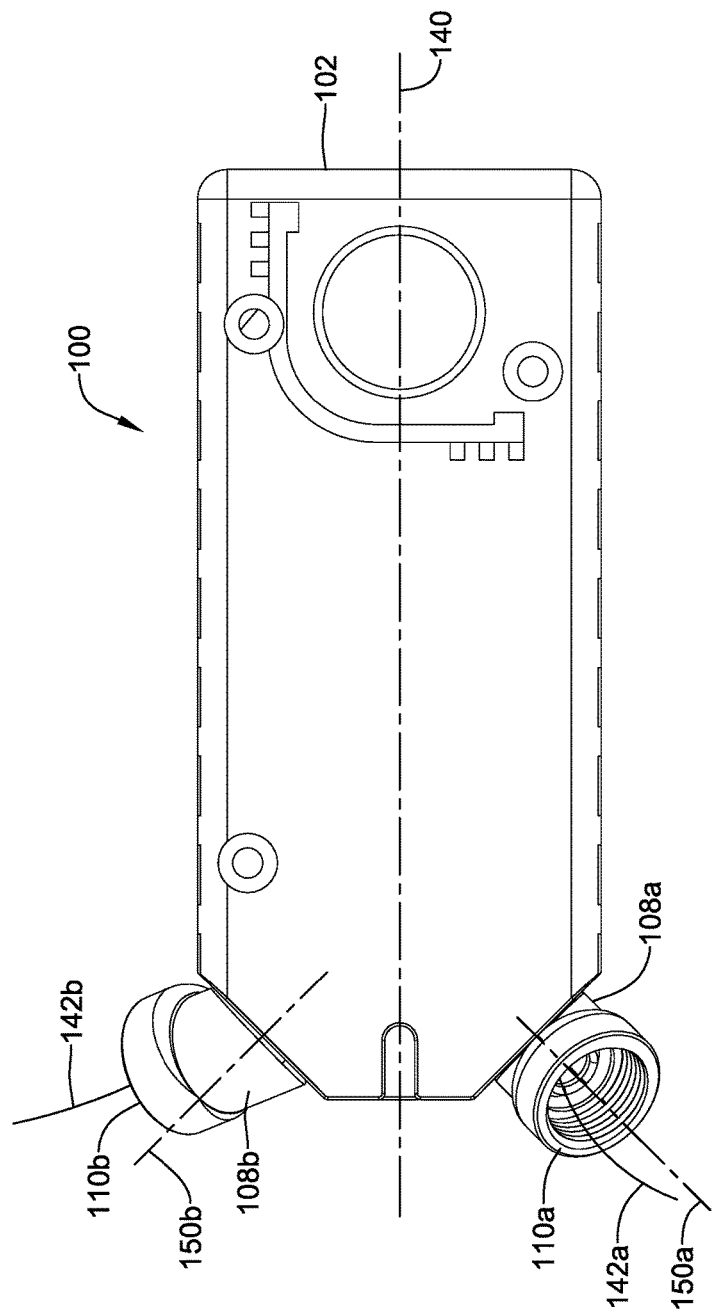

In FIG. 11C, the first conduit tube 108a and the second conduit tube 108b have been rotated about their respective axis 150a, 150b such that the openings 110a, 110b both open or face a direction generally perpendicular to the longitudinal axis 140. However, the openings 110a, 110b may face in opposite directions from one another. For example, the first cable 142a may exit the actuator 102 in a first lateral direction and the second cable 142b may exit the actuator 102 in a second lateral direction, opposite the first lateral direction. In FIG. 11D, the first conduit tube 108a and the second conduit tube 108b have been rotated about their respective axis 150a, 150b such that the openings 110a, 110b open or face a non-orthogonal direction to the longitudinal axis 140. In FIG. 11E, the first conduit tube 108a and the second conduit tube 108b have been rotated about their respective axis 150a, 150b such that the first opening 110a opens or faces a non-orthogonal direction to the longitudinal axis 140 and the second opening 110b opens or faces a direction generally perpendicular to the longitudinal axis 140. In FIG. 11F, the first conduit tube 108a and the second conduit tube 108b have been rotated about their respective axis 150a, 150b such that the openings 110a, 110b open or face a non-orthogonal direction to the longitudinal axis 140. However, the openings 110a, 110b may face in opposite directions from one another.

EXAMPLES

In a first example, a valve actuator assembly for actuating an actuator output to drive an input shaft of a Heating, Ventilation, and Air Conditioning (HVAC) air damper may comprise a housing, an electric motor situated in the housing, and a drive train operatively coupled to the electric motor for rotating the actuator output. A first conduit tube defining a lumen having an inlet facing inside of the housing and an outlet facing outside of the housing may be coupled to the housing. The first conduit tube may be configured to change a direction that the outlet of the first conduit tube faces when the first conduit tube is rotated relative to the housing.

Alternatively or additionally to any of the examples above, in another example, the housing may comprise first side and an opposing second side, wherein the actuator output extends out through the first side. The housing may further comprise a top side and an opposing bottom side extending between the first side and the second side. The bottom side may comprise a first region that is generally parallel to the top side and a second region that is not parallel to the top side, wherein the first conduit tube may be rotatably coupled to the second region of the housing.

Alternatively or additionally to any of the examples above, in another example, the second region may intersect the first region at an angle of between 20 and 80 degrees.

Alternatively or additionally to any of the examples above, in another example, the second region may intersect the first region at an angle of between 30 and 60 degrees.

Alternatively or additionally to any of the examples above, in another example, the first conduit tube may be configured such that the direction that the outlet faces is not orthogonal to the second region.

Alternatively or additionally to any of the examples above, in another example, the valve actuator assembly may further comprise a second conduit tube rotatably coupled to the housing at a location spaced from the first conduit tube. The second conduit tube may define a lumen having an inlet facing inside of the housing and an outlet facing outside of the housing. The second conduit tube may be configured to change the direction that the outlet of the second conduit tube faces when the second conduit tube is rotated relative to the housing.

Alternatively or additionally to any of the examples above, in another example, the first conduit tube and the second conduit tube may be configured to be rotatable independent of one another.

Alternatively or additionally to any of the examples above, in another example, the housing may comprise a first side and an opposing second side, wherein the actuator output extends out through the first side. The housing may further comprise a top side and an opposing bottom side extending between the first side and the second side. The bottom side may comprise a first region that is generally parallel to the top side, a second region that is not parallel to the top side, wherein the first conduit tube is rotatably coupled to the second region of the housing; and a third region that is not parallel to the top side and not parallel to the second region, wherein the second conduit tube is rotatably coupled to the third region of the housing.

Alternatively or additionally to any of the examples above, in another example, the housing may comprise a first side and an opposing second side, wherein the actuator output extends out through the first side. The housing may further comprise a top side and an opposing bottom side extending between the first side and the second side. The bottom side may comprise a first conduit receiving region that is not parallel to the top side, wherein the first conduit tube is rotatably coupled to the first conduit receiving region of the housing and a second conduit receiving region that is not parallel to the top side and not parallel to the first conduit receiving region, wherein the second conduit tube is rotatably coupled to the second conduit receiving region of the housing.

Alternatively or additionally to any of the examples above, in another example, the first conduit tube may comprise a flange, a body, and a neck extending between the flange and the body, wherein the flange is situated inside of the housing, the neck extends through an aperture in the housing, and the body is situated outside of the housing.

Alternatively or additionally to any of the examples above, in another example, the valve actuator assembly may further comprise a stop mechanism for limiting a range of rotation of the first conduit tube relative to the housing.

Alternatively or additionally to any of the examples above, in another example, the stop mechanism may be configured to limiting the range of rotation of the first conduit tube relative to the housing to 360° or less.

In another example, a Heating, Ventilation, and Air Conditioning (HVAC) device for controlling one or more HVAC components of an HVAC system of a building may comprise a housing, one or more electrical components situated in the housing, and a first conduit tube rotatably coupled to the housing. The first conduit tube may define a lumen having an inlet facing inside of the housing and an outlet facing outside of the housing, wherein the first conduit tube is configured to change a direction that the outlet of the first conduit tube faces when the first conduit tube is rotated relative to the housing.

Alternatively or additionally to any of the examples above, in another example, the housing may comprise a first side and an opposing second side, a top side and an opposing bottom side extending between the first side and the second side. The bottom side may comprise a first region that is generally parallel to the top side and a second region that is not parallel to the top side. The first conduit tube may be rotatably coupled to the second region of the housing.

Alternatively or additionally to any of the examples above, in another example, the second region may intersect the first region at an angle of between 30 and 60 degrees.

Alternatively or additionally to any of the examples above, in another example, the first conduit tube may be configured such that the direction that the outlet faces is not orthogonal to the second region.

Alternatively or additionally to any of the examples above, in another example, the HVAC device may further comprise a second conduit tube rotatably coupled to the housing at a location spaced from the first conduit tube, the second conduit tube defining a lumen having an inlet facing inside of the housing and an outlet facing outside of the housing, wherein the second conduit tube is configured to change the direction that the outlet of the second conduit tube faces when the second conduit tube is rotated relative to the housing.

Alternatively or additionally to any of the examples above, in another example, the HVAC device may further comprise a stop mechanism for limiting a range of rotation of the first conduit tube relative to the housing.

In another example, a valve actuator for actuating a valve may comprise a housing, an actuator output, an electric motor situated in the housing, a drive train operatively coupled to the electric motor for rotating the actuator output, a first conduit tube, and a second conduit tube. The housing may comprise a first side and an opposing second side. The second side may comprise a first conduit receiving region that is not parallel to the first side and a second conduit receiving region that is not parallel to the first side and not parallel to the first conduit receiving region. The first conduit tube may be rotatably coupled to the first conduit receiving region of the housing and the second conduit tube may be rotatably coupled to the second conduit receiving region of the housing.

Alternatively or additionally to any of the examples above, in another example, the valve actuator may further comprise a stop mechanism for limiting a range of rotation of the first conduit tube relative to the housing.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

What is claimed is:

1. A valve actuator assembly for rotating an input shaft of a Heating, Ventilation, and Air Conditioning (HVAC) air damper, the valve actuator assembly comprising:
   an actuator output for rotating the input shaft of the HVAC air damper;
   a housing;
   an electric motor situated in the housing;
   a drive train operatively coupled to the electric motor for rotating the actuator output;
   a first conduit tube rotatably coupled to the housing, the first conduit tube defining a lumen having an inlet facing inside of the housing and an outlet facing outside of the housing, wherein the first conduit tube is configured to change a direction that the outlet of the first conduit tube faces when the first conduit tube is rotated relative to the housing; and
   wherein the first conduit tube includes a flange, a body, and a neck extending between the flange and the body, wherein the flange is integral with the neck and the body, and wherein the flange is situated inside of the housing and has a lateral dimension that is larger than a diameter of an aperture extending through the housing, the neck is situated in the aperture, and the body is situated outside of the housing.

2. The valve actuator assembly of claim 1, wherein the housing comprises:
   a first side and an opposing second side, wherein the actuator output extends out through the first side;
   a top side and an opposing bottom side extending between the first side and the second side, wherein the bottom side comprises:
      a first region that is generally parallel to the top side; and
      a second region that is not parallel to the top side, wherein the first conduit tube is rotatably coupled to the second region of the housing.

3. The valve actuator assembly of claim 2, wherein the second region intersects the first region at an angle of between 20 and 80 degrees.

4. The valve actuator assembly of claim 3, wherein the second region intersects the first region at an angle of between 30 and 60 degrees.

5. The valve actuator assembly of claim 2, wherein the first conduit tube is configured such that the direction that the outlet faces is not orthogonal to the second region.

6. The valve actuator assembly of claim 1, further comprising a second conduit tube rotatably coupled to the housing at a location spaced from the first conduit tube, the second conduit tube defining a lumen having an inlet facing inside of the housing and an outlet facing outside of the housing, wherein the second conduit tube is configured to change the direction that the outlet of the second conduit tube faces when the second conduit tube is rotated relative to the housing.

7. The valve actuator assembly of claim 6, wherein the first conduit tube and the second conduit tube are configured to be rotatable independent of one another.

8. The valve actuator assembly of claim 6, wherein the housing comprises:
a first side and an opposing second side, wherein the actuator output extends out through the first side;
a top side and an opposing bottom side extending between the first side and the second side, wherein the bottom side comprises:
a first region that is generally parallel to the top side;
a second region that is not parallel to the top side, wherein the first conduit tube is rotatably coupled to the second region of the housing; and
a third region that is not parallel to the top side and not parallel to the second region, wherein the second conduit tube is rotatably coupled to the third region of the housing.

9. The valve actuator assembly of claim 6, wherein the housing comprises:
a first side and an opposing second side, wherein the actuator output extends out through the first side;
a top side and an opposing bottom side extending between the first side and the second side, wherein the bottom side comprises:
a first conduit receiving region that is not parallel to the top side, wherein the first conduit tube is rotatably coupled to the first conduit receiving region of the housing; and
a second conduit receiving region that is not parallel to the top side and not parallel to the first conduit receiving region, wherein the second conduit tube is rotatably coupled to the second conduit receiving region of the housing.

10. The valve actuator assembly of claim 1, further comprising a stop mechanism for limiting a range of rotation of the first conduit tube relative to the housing.

11. The valve actuator assembly of claim 10, wherein the stop mechanism is configured to limiting the range of rotation of the first conduit tube relative to the housing to 360° or less.

12. A Heating, Ventilation, and Air Conditioning (HVAC) device for controlling one or more HVAC components of an HVAC system of a building, the HVAC device comprising:
a housing having a top housing portion and a bottom housing portion, each of the top and bottom housing portions defining at least part of an aperture that extends through the housing;
one or more electrical components situated in the housing; and
a first conduit tube rotatably coupled to the housing, the first conduit tube including a flange, a body, and a neck extending between the flange and the body, wherein the flange is integral with the neck and the body, and wherein the flange is situated inside of the housing and has a lateral dimension that is larger than a diameter of the aperture, the neck is situated in the aperture, and the body is situated outside of the housing, the first conduit tube defining a lumen having an inlet facing inside of the housing and an outlet facing outside of the housing, wherein the first conduit tube is configured to change a direction that the outlet of the first conduit tube faces when the first conduit tube is rotated relative to the housing.

13. The HVAC device of claim 12, wherein the housing comprises:
a first side and an opposing second side;
a top side and an opposing bottom side extending between the first side and the second side, wherein the bottom side comprises:
a first region that is generally parallel to the top side; and
a second region that is not parallel to the top side, wherein the first conduit tube is rotatably coupled to the second region of the housing.

14. The HVAC device of claim 13, wherein the second region intersects the first region at an angle of between 30 and 60 degrees.

15. The HVAC device of claim 12, wherein the first conduit tube is configured such that the direction that the outlet faces is not orthogonal to the second region.

16. The HVAC device of claim 12, further comprising a second conduit tube rotatably coupled to the housing at a location spaced from the first conduit tube, the second conduit tube defining a lumen having an inlet facing inside of the housing and an outlet facing outside of the housing, wherein the second conduit tube is configured to change the direction that the outlet of the second conduit tube faces when the second conduit tube is rotated relative to the housing.

17. The HVAC device of claim 12, further comprising a stop mechanism for limiting a range of rotation of the first conduit tube relative to the housing.

18. A valve actuator for actuating a valve, the valve actuator comprising:
a housing;
an actuator output;
an electric motor situated in the housing;
a drive train operatively coupled to the electric motor for rotating the actuator output;
a first conduit tube;
a second conduit tube;
the housing comprising a first side and an opposing second side, wherein the second side comprises:
a first conduit receiving region that is not parallel to the first side and includes a first protruding portion that is spaced from a wall of the housing adjacent a first aperture through the wall of the housing to define a first flange receiving cavity between the wall of the housing and the first protruding portion, wherein the first conduit tube is rotatably coupled to the first conduit receiving region of the housing with a first flange of the first conduit tube positioned within and rotatable with respect to the first flange receiving cavity; and a second conduit receiving region that is not parallel to the first side and not parallel to the first conduit receiving region and includes a second protruding portion that is spaced from a wall of the housing adjacent a second aperture through the wall of the housing to define a second flange receiving cavity between the wall of the housing and the second protruding portion, wherein the second conduit tube is rotatably coupled to the second conduit receiving region of the housing with a second flange of the second conduit tube positioned within and rotatable with respect to the second flange receiving cavity.

19. The valve actuator of claim 18, further comprising a stop mechanism for limiting a range of rotation of the first conduit tube relative to the housing.

* * * * *